No. 607,667. Patented July 19, 1898.
A. I. THAYER.
EQUALIZING APPLIANCE FOR BICYCLES.
(Application filed May 19, 1897.)
(No Model.) 2 Sheets—Sheet 1.
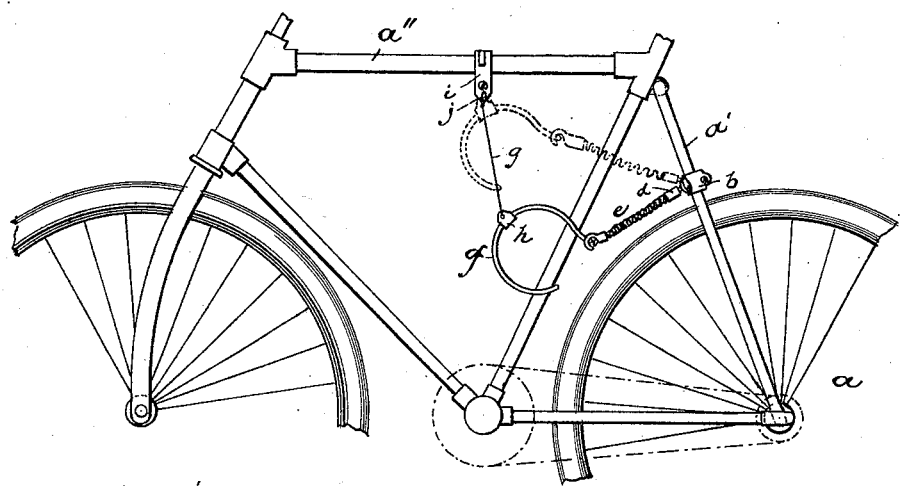
Fig. 1.
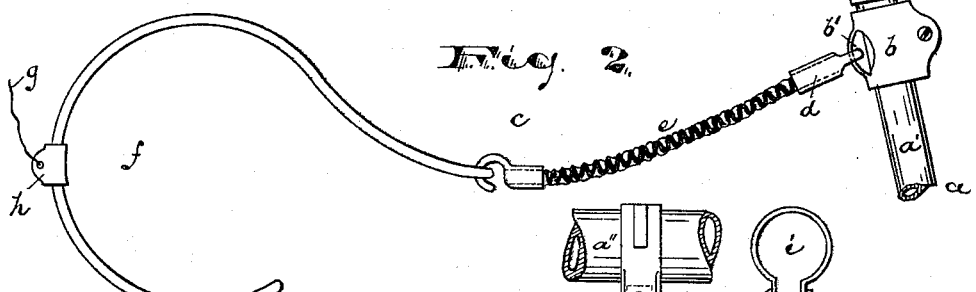
Fig. 2.
Fig. 3. Fig. 4.
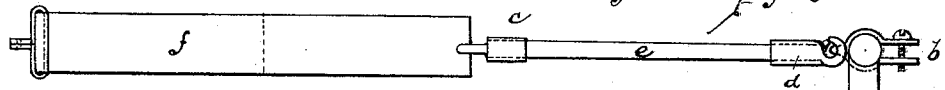
Fig. 5.
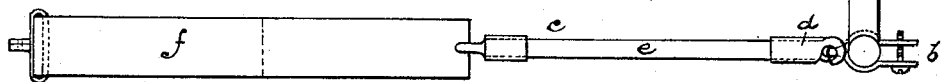
WITNESSES: Alfred I. Thayer, INVENTOR:
BY Drake
ATTORNEYS No. 607,667. Patented July 19, 1898.
A. I. THAYER.
EQUALIZING APPLIANCE FOR BICYCLES.
(Application filed May 19, 1897.)
(No Model.) 2 Sheets—Sheet 2.
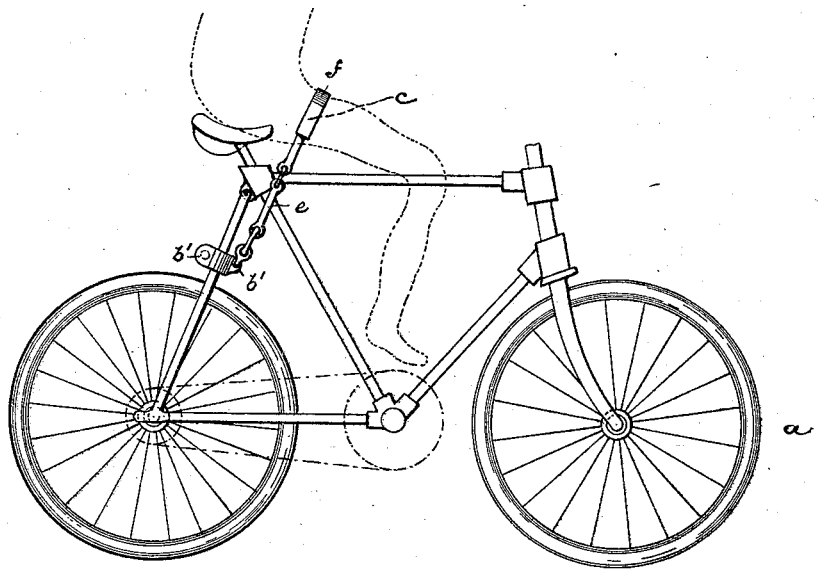
Fig. 6.
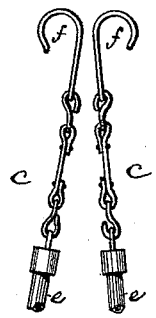
Fig. 7. Fig. 8.
WITNESSES: Alfred I. Thayer, INVENTOR:
BY Drake & Co.
ATTORNEYS.

UNITED STATES PATENT OFFICE.

ALFRED I. THAYER, OF NEWARK, NEW JERSEY.

EQUALIZING APPLIANCE FOR BICYCLES.

SPECIFICATION forming part of Letters Patent No. 607,667, dated July 19, 1898.

Application filed May 19, 1897. Serial No. 637,201. (No model.)

*To all whom it may concern:*

Be it known that I, ALFRED I. THAYER, a citizen of the United States, residing at Newark, in the county of Essex and State of New Jersey, have invented certain new and useful Improvements in Power Storing and Equalizing Appliances for Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to distribute the expenditure of power over a greater number of muscles and to relieve the leg-muscles in the operation of driving a bicycle and thereby to enable the rider to drive his bicycle a longer period without becoming tired, to enable the machine to be driven with increased speed and power, and to secure other advantages and results, some of which may be referred to hereinafter in connection with the description of the working parts.

The invention consists in the power storing and equalizing appliances for bicycles and in the arrangements and combinations of parts, all substantially as will be hereinafter set forth, and finally embraced in the clauses of the claim.

Referring to the accompanying drawings, in which like letters of reference indicate corresponding parts in each of the views, Figure 1 is a side elevation of a portion of a bicycle having my improved appliances. Fig. 2 is a detail view of the appliances attached to the vehicle in side elevation, on an enlarged scale. Figs. 3 and 4 are detail views of a certain catch for holding the leg-hooks when not in use. Fig. 5 is a plan of said appliances. Fig. 6 is a side elevation showing the appliances hooked upon the legs of the rider, and Figs. 7 and 8 are details showing the construction of the leg-hooks more clearly.

In said drawings, $a$ indicates an ordinary bicycle, to the frame of which, at any suitable point, preferably the rear bars $a'$, are attached, by means of clamps $b$, having eyes $b'$, or other suitable means, spring equalizing appliances $c\ c$, comprising spring snap hooks or links $d$ $d$, elastic pieces $e\ e$, either of helical metal wire or rubber, and leg-hooks $f\ f$. The said elastic pieces $e\ e$ are removably fastened to the clamps at the rear ends, and at their opposite ends are attached to the said leg-hooks $f$, which are also removable from the elastic pieces to admit an interchange of pieces $e$ of various degrees of resiliency. The parts thus described are so disposed that the leg-hooks engage or may be caught upon the legs or thighs of the rider and remain constantly, or nearly so, under a slight tension, so that the hooks will be held in proper place on the thigh during the riding operations, although said hooks may by their own spring-power grasp the leg and thus be held in position. The hooks, being of spring metal in strap-like form, easily permit the withdrawal of the legs in the event of the rider losing his balance and jumping from the vehicle, and the withdrawal is facilitated by said hooks being held by cords $g$, which latter are attached to the eyes of the hooks and to the connections $i$ upon the upper bar or brace $a''$ of the vehicle. The connections $i$ also provide hooks $j\ j$, from which the leg-hooks may be suspended when not in use. Said connections may be removably attached by clamps or otherwise to the said brace $a''$ or to any other suitable part of the vehicle.

In operation the tension of the springs $e$ increases as the pedals rise from their lowest points of movement. When the pedals are at their highest points, the springs are at their greatest tension. The tension or power thus stored up in the springs $e$ is exerted in the downward movement of the crank, the power of the leg and of the spring or appliance being thus exerted coöperatively to increase the speed of the vehicle. The storing of power brings a different set of muscles into play from those commonly employed in pressing down the pedals, and thus the exerted power is derived from additional sources.

By the arrangement shown by placing the leg-hook toward the knee the tension upon the spring is increased, as will be evident. Thus when great speed is desired the operator can adjust his appliances accordingly.

The leg-hooks are preferably of springsteel inclosed in a jacket of leather or other suitable material.

Having thus described the invention, what I claim as new is—

1. The combination with the frame of the bicycle of leg-hooks connected to the said frame by elastic connections substantially as set forth.

2. The combination with the bicycle, of the elastic pieces clamped to said bicycle and snap-hooks at the opposite ends of said elastic pieces and leg-hooks secured to the elastic pieces and adapted to be arranged upon the thighs of the rider and be removable from said elastic connections, substantially as set forth.

3. The combination with the bicycle-frame, of a clamp $b$, removable from the said frame and having an eye $b'$, hooks or links $d$, elastic pieces $e$, and leg-hooks $f$, all arranged and combined, substantially as set forth.

In testimony that I claim the foregoing I have hereunto set my hand this 4th day of May, 1897.

ALFRED I. THAYER.

Witnesses:
CHARLES H. PELL,
C. B. PITNEY.